US008690577B2

(12) United States Patent
Cahoon et al.

(10) Patent No.: US 8,690,577 B2
(45) Date of Patent: Apr. 8, 2014

(54) SYSTEM AND METHOD FOR PROVIDING AN INSTITUTIONAL NUTRITION SERVICE (76) Inventors: Jeffrey Cahoon, Williamson, NY (US); Paul Wagner, Whitehouse Station, NJ (US); Scott Elser, Whitehouse Station, NJ (US); David Low, Rye Brook, NY (US)

(*) Notice: Subject to any disclaimer, the term of this patent is extended or adjusted under 35 U.S.C. 154(b) by 0 days.

(21) Appl. No.: 13/527,919

(22) Filed: Jun. 20, 2012

(65) Prior Publication Data
US 2013/0157231 A1 Jun. 20, 2013

Related U.S. Application Data (60) Provisional application No. 61/498,821, filed on Jun. 20, 2011.

(51) Int. Cl.
G09B 19/00 (2006.01)
(52) U.S. Cl.
USPC ............. 434/127; 705/28; 705/50; 705/51; 705/1.1; 600/300; 707/802
(58) Field of Classification Search
USPC ........ 705/28, 15, 26.3, 7.12, 339; 340/286.09
See application file for complete search history.

(56) References Cited

U.S. PATENT DOCUMENTS

| 5,939,974 | A | 8/1999 | Heagle et al. |
| 5,954,640 | A | 9/1999 | Szabo |
| 6,987,452 | B2 | 1/2006 | Yang |
| 7,167,844 | B1 * | 1/2007 | Leong et al. ............. 705/80 |
| 7,302,403 | B1 | 11/2007 | Landau et al. |
| 7,505,929 | B2 * | 3/2009 | Angert et al. ............ 705/26.3 |
| 7,680,690 | B1 * | 3/2010 | Catalano ................. 705/15 |
| 7,752,075 | B2 | 7/2010 | Angert et al. |
| 2001/0001854 | A1 | 5/2001 | Schena et al. |
| 2002/0107747 | A1 | 8/2002 | Gerogianni |
| 2002/0161612 | A1 | 10/2002 | Jurden |
| 2002/0198790 | A1 * | 12/2002 | Paulo et al. ............. 705/26 |
| 2003/0083919 | A1 | 5/2003 | Hammann |
| 2004/0054592 | A1 | 3/2004 | Hernblad |
| 2004/0059633 | A1 * | 3/2004 | Rankin et al. ............ 705/15 |
| 2004/0073449 | A1 | 4/2004 | Yang |
| 2004/0204950 | A1 | 10/2004 | Vlahos |
| 2005/0108078 | A1 | 5/2005 | Royale et al. |

(Continued)

FOREIGN PATENT DOCUMENTS

| WO | 03038722 A1 | 5/2003 |
| WO | 2007041672 A2 | 4/2007 |

OTHER PUBLICATIONS

United States Department of Agriculture (USDA), "Contracting with Food Service Management Companies: Guidance for School Food Authorities", Apr. 2009, pp. I1-G5.

(Continued)

Primary Examiner — Vanel Frenel
(74) Attorney, Agent, or Firm — Heslin Rothenberg Farley & Mesiti P.C.

(57) ABSTRACT

A method, system and computer program product is described for providing meals to consumers in a school district. The method includes utilizing a computer processor to obtain meal offering submissions from food service suppliers, determining whether the meal offering comply with predefined guidelines and displaying the meal offerings that meet the guidelines on a client for selection by a user, and obtaining via user input, orders for the meal offerings.

20 Claims, 6 Drawing Sheets

(56) References Cited

U.S. PATENT DOCUMENTS

| | | |
|---|---|---|
| 2007/0088624 A1 | 4/2007 | Vaughn et al. |
| 2007/0150375 A1 | 6/2007 | Yang |
| 2007/0168205 A1* | 7/2007 | Carlson et al. ............ 705/1 |
| 2009/0198547 A1* | 8/2009 | Sudak ............ 705/8 |
| 2010/0332356 A1* | 12/2010 | Spolar ............ 705/27.1 |
| 2011/0258134 A1* | 10/2011 | Mendez ............ 705/332 |

OTHER PUBLICATIONS

Michael Sudak. (2004-2012). Improve your meal ordering software. In Hot Lunch Online. Retrieved Nov. 1, 2012, from www.hotlunchonline.com.

* cited by examiner

SYSTEM AND METHOD FOR PROVIDING AN INSTITUTIONAL NUTRITION SERVICE

CROSS-REFERENCE TO RELATED APPLICATION

This application claims the benefit of U.S. Provisional Application No. 61/498,821 filed Jun. 20, 2011.

FIELD OF THE INVENTION

This invention relates generally to an institutional nutrition service method and system, and in particular, to school food service methods. The invention further relates to a computer-implemented method, a computer system, and a computer program product for school nutrition services.

BACKGROUND OF THE INVENTION

Every public school district has a lunch program and about 75% of districts also offer breakfast to students. Traditionally, school nutrition falls into two broad traditional categories—privately and publicly managed nutrition programs. According to a CDC report in 2006, about 75% of school districts run their own publicly-managed food service program. When publicly managed, the school district or institution manages the food service, orders and prepares the food items and maintains the expense of a kitchen and kitchen staff. Following this model, the kitchen staff is required to order and prepare the food, plan the menus, and do the bookkeeping, accounting and similar administerial tasks. Maintenance of a kitchen, kitchen staff and nutrition program by a school district or other institution is typically not economically feasible within their limited budgets, especially when the district is below a certain size. There are also frequent health and safety issues.

Every public school district has a lunch program and about 75% of districts also offer breakfast to students. Traditionally, school nutrition falls into two broad traditional categories—privately and publicly managed nutrition programs. According to a CDC report in 2006, about 75% of school districts run their own publicly-managed food service program. When publicly managed, the school district or institution manages the food service, orders and prepares the food items and maintains the expense of a kitchen and kitchen staff. Following this model, the kitchen staff is required to order and prepare the food, plan the menus, and do the bookkeeping, accounting and similar administerial tasks. Maintenance of a kitchen, kitchen staff and nutrition program by a school district or other institution is typically not economically feasible within their limited budgets, especially when the district is below a certain size. There are also frequent health and safety issues.

The remaining 25% of schools that offer breakfast or lunch use an outside food service management company to operate the school nutrition services program for their district. In some instances, the school district contracts with private management companies to provide complete food management services, but not to supply a la carte food items. For example, these companies offer menu ideas, recipes, employee training, purchasing assistance, inventory control, and other management services. In other instances, the management company not only runs the service, but also supplies the ala carte food items. Either way, because these private, outside management companies supply meals to a number of institutions, they are able to split the cost of the kitchen facility and staff over a number of school districts or other institutions resulting in lower food costs.

Recent studies have shown, however, that although the average cost of a lunch from a privately managed service may be lower than a publicly managed service, there is no evidence that privatized nutrition services yield savings for the school districts or institutions. For example, although labor costs may decrease there are increased fees that need to be paid to the private contractor. Similarly, although food costs decline with private management, this reduction is offset by the rise in the relative cost of supplies for disposable cutlery, plates, etc. Furthermore, there is no savings in transportation cost.

Another disadvantage under privatized management is the districts and students have little to no input or choice in terms of food selection. In many instances, the food transported to the school is the only choice available to the student. Although there may be greater variety in the situation where the private contractor is also supplying a la carte items, private management is more often associated with a less diverse food selection for the students. Privately managed nutrition services also tend to provide a larger selection of high-fat and high-sugar items, which typically are chosen by the students over the "healthier" items.

A third category of privatized food service is a catering food service. Under this type of food service, the school district contracts with a catering institution that allows individuals at a number of different schools to order their desired food items from the catering organization. For example, US Pub. No. 2009/0198547 A1 discusses the use of a single caterer (or multiple caterers) to provide individualized meals for customers at a number of different institutions via a central catering system. As with the publicly managed food service programs, the catering service model offers no competitive incentives or purchasing power to lower the customer's cost of individual food items within the school nutrition program. In fact, from a practical standpoint, the former catering service model is too expensive to be sustainable and does not result in money being returned back to the school district. Additionally, this system does not ensure "healthy" food items and food safety within the smaller, individual catering businesses is difficult, if not impossible, to monitor and manage.

Fast food and "fast casual" restaurants, also known as quick service restaurants (QSRs), represent one of the largest segments of the food industry. QSRs are known for their short food preparation time. Some of the largest national players in this category include Dunkin Donuts, McDonald's, Subway, Chick-Fil-A, Wendy's, and Burger King. Newer "fast casual" restaurants, on a national scale, include Chipotle, Panora Bread, and Au Bon Pain and can also include coffee house chains such as Starbucks. For purposes of this invention, QSRs also include national and regional supermarket chains that provide "prepared food", such as Whole Foods Markets, Tops and Wegmans, as well as regional/local fast casual chain restaurants.

Record numbers of obesity over the past few years, in both children and adults, have drawn attention to the need for healthy lifestyle choices and have resulted in a general trend towards health and wellness, including healthy eating. This trend toward healthy eating has forced QSRs to develop and add new, healthier offerings to their menus. Many QSRs have removed trans-fats and other unhealthy ingredients from their offerings, have increased menu items that contain fruits or vegetables, and have increased menu items that are labeled as either vegetarian, organic and/or "healthy."

No system presently exists that enables an institution, such as a school district, to contract with multiple QSRs to provide a variety of healthy, low-cost nutrition services to student within a school district via a centralized, internet-based food management program, wherein the individual student's daily food selection is processed as a transaction between the student and QSR, and where money is ultimately returned back to the school district.

U.S. Provisional Application No. 61/498,821, which is incorporated herein by reference in its entirety, describes the system and method of the present invention, a privatized, competitive nutrition service created for the benefit of the individual participants (i.e. student/parent), the school districts and the local, contracting QSRs. Another aspect of the invention is to provide a system and method for a privatized nutrition service with a variety of healthy food items for children to select while at school. The system and method also provide advertising means for contracting QSRs at the corporate level and provide educational means for teaching nutrition, encouraging higher education and energizing competition. Additionally, the internet-based ordering, delivery leasing program and school refund program gives back money to the school districts.

BRIEF SUMMARY

The shortcomings of the prior art are overcome and additional advantages are provided through the provision of a method, system and computer program product to enable an institution, such as a school district, to contract with multiple QSRs to provide nutrition services to registrants within a school district, wherein the individual registrant's daily food selection is processed as a transaction between the registrant and QSR.

It is one aspect of the invention to provide a computer-implemented, nutrition service method comprising the steps of providing a nutrition service organization comprised of a minimum of at least two contracting food service suppliers and at least one institutional member, wherein said member comprises a plurality of institutions and each institution comprises a plurality of individual participants; providing a nutrition service system operative to electronically communicate with said at least two food service suppliers, said institutions and the plurality of individual participants; receiving electronic data feeds from each of said food service suppliers regarding at least one qualified menu item and processing said information to provide a selection of a plurality of qualified menu items to participants; enabling said plurality of individual participants to electronically select qualified menu items from said selection of qualified menu items; communicating the qualified menu items selected by the plurality of individual participants to the food service suppliers; transmitting payment for said qualified menu items; scheduling delivery by the food service suppliers of said qualified menu items to the institutions.

Systems relating to one or more aspects of the present invention are also described and claimed herein and a further aspect of the invention is to provide a computer system for providing a nutrition service, for example, comprising a memory; a processor, in communications with the memory, wherein the processor is configured to perform a method comprising the aforementioned steps.

Further yet, computer program products relating to one or more aspects of the present invention are also described and claimed herein. A computer program product may be embodied in one or more computer readable medium(s) having computer readable program code embodied thereon for performing a method. The method may include, for instance, the method as described above and throughout the specification.

Thus, a still further aspect of the invention is to provide a computer program comprising a storage medium readable by a processing circuit and storing instructions for execution by the processing circuit for performing a method comprising the aforementioned steps.

Additional features and advantages are realized through the techniques of the present invention. Other embodiments and aspects of the invention are described in detail herein and are considered a part of the claimed invention.

DEFINITIONS

Nutrition Service Organization (100): An entity that provides, administers, manages, and facilitates a nutrition service delivery method, system, and program to supply food items to a member school district School District (200): A school district that registers as a member of the Nutrition Service Organization Educational Institution (210): A particular school building within the member School District Participants (300): Students/Families within the member School District that register with the Nutrition Service Organization QSR Suppliers (400): Multiple third-party, unaffiliated suppliers of food items that contract with the Nutrition Service Organization to provide food items to the member School District.

Nutrition Service Database (105): Where registration, QSR Supplier, food menu and selection, food item transaction, payment information and other related data is stored Nutrition Service System (110): Consists of software and/or hardware components to coordinate and facilitate registration, food item transactions (including payment), advertising and other related and ancillary communications.

Qualified Menu Items (50): Meals and individual food items a participant can select and pre-order for lunch and breakfast and that are delivered directly from contracting QSRs

DETAILED DESCRIPTION

The invention comprises a method and system to administer, manage and facilitate the processing and delivery of Qualified Menu Items 50 to Educational Institutions 210 within a member School District 200 via a Nutrition Service Organization 100. In particular, the invention comprises a Nutrition Service System 110, including but not limited to a Database 105, Software 106, and online service platform 1800, that provides a method and program for individual students within a School District 200 to register with the Nutrition Service Organization 100 and advance-order Qualified Menu Items 50 for each school day in attendance.

QSRs in close proximity to a given school district are contracted to participate in the school lunch program for that school district. A given QSR may be geographically convenient to more than one school district and may be solicited/ contracted at both school districts. Once the supply of meals available from contracted QSRs matches the predicted and/or actual demand from the participating school district, the assigned QSRs are rotated at the school district to provide variety to participants in menu selection. Participants are given at least two meal choices to choose from at each meal, each choice from a different QSR. Participants order their meals in advance to allow prompt delivery from the geographically convenient QSR to the school. Meal choices provided by the QSRs meet predefined guidelines. These guidelines are the criteria for participation in the program. In an embodiment of the present invention, each QSR offers only a single meal choice for the duration of its contract. Thus, rotating the QSRs on a regular basis gives variety to participants.

Figure 1:
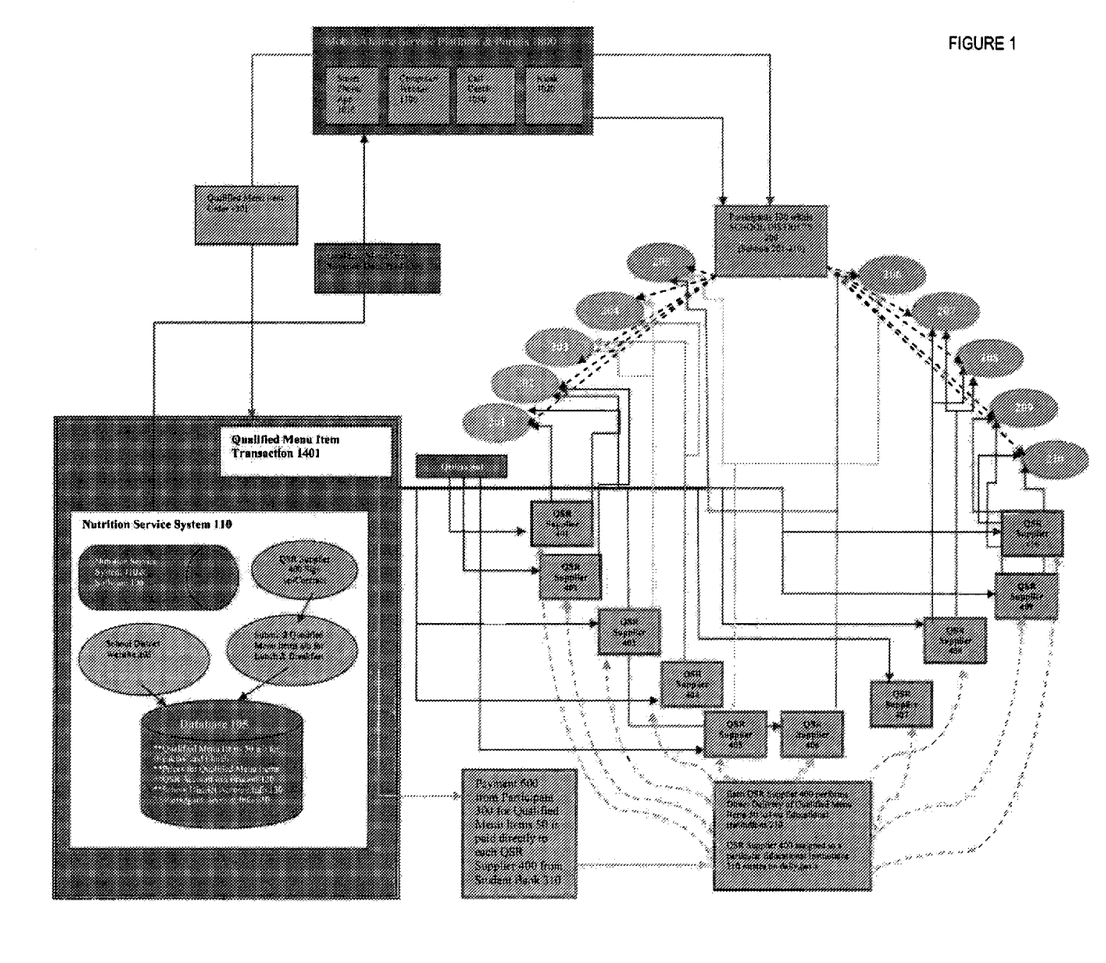
FIG. 1 depicts a schematic representation of one embodiment of the Nutrition Service Organization in accordance with one aspect of the present invention

FIG. 1 depicts a schematic representation of one embodiment of the Nutrition Service Organization in accordance with one aspect of the invention. As shown in this figure, Nutrition Service Organization 100 contracts with multiple, unaffiliated Quick Service Restaurant (QSR) Suppliers 400 to supply at least one Qualified Menu Item 50a for school lunch. Certain other QSR Suppliers 400 will contract to provide at least one Qualified Menu Items 50b for school breakfast, either alone or in addition to a Qualified Menu Item 50a for school lunch. Each of Qualified Menu Items 50a and 50b is entered into the Nutrition Service Database 105.

In an embodiment of the present invention, each of Qualified Menu Items 50a and 50b is entered into the database by an administrator. In a further embodiment of the present invention, each item entered, such as Qualified Menu Items 50a and 50b, is verified by a software-implemented verification process executed on a processor. Each item is verified to make sure that the items meets the specified health guidelines.

In an embodiment, each contracting QSR 400 pays a set contract fee 500 to Nutrition Service Organization 100 for its participation in the school food program. A portion of said set contract fee 500, as determined by Nutrition Service Organization 100, is returned or "refunded" to School District 200.

In an aspect of this invention, each Qualified Menu Item 50 satisfies pre-defined nutritional guidelines. In an embodiment of the method, the pre-defined nutritional guidelines are the current USDA nutritional requirements for the National School Lunch Program (NSLP) and School Breakfast Program (NSBP). The NSLP and NSBP are federally assisted meal programs operating in public and nonprofit private schools. These programs provide nutritionally balanced, reduced-cost or free lunches and breakfasts to children in school. The nutritional requirements for both programs can be found at www.fns.usda.gov. Currently, the requirements specify that school breakfast meals (50b) provide 25% of the U.S. Recommended Dietary Allowance for protein, calories, calcium, iron and vitamins A and C, and that no more than 30% of calories can come from fat and less than 10% from saturated fat. In accordance with these guidelines, school lunches (50a) provide 33.3% of the Recommended Dietary Allowances of protein, Vitamin A, Vitamin C, iron, calcium and calories.

As shown in FIG. 1, Nutrition Service Database 105 includes information regarding each individual student, or Participant 300, that participates in the school lunch or breakfast program within a school district. In an embodiment, the Nutrition Service Database 105 of the system is connected to and integrated with a pre-existing School District database 205 and, in some instances, its website. The data can be housed in individual databases, or in a consolidated database. The two databases can securely access each other in real-time, over a secure connection, and/or an export from one database can be timely uploaded to another. These are just some examples, but one of skill in the art will recognize that provided that the application accesses the data, the location of the data is immaterial and can be housed in many different systems configured differently.

In this embodiment, registration information regarding the individual Participants 300 is collected, managed and stored in the School Districts preexisting database 205. This may include information such as ID, Login/password information, order history, contact information, parent information, Student Bank Account information, and the like. In another aspect of the invention, information regarding Participants 300 is managed, collected, and calculated via the Nutrition Service System 110, and stored in the Nutrition Service Database 105, independent from a pre-existing school district database and system. In this embodiment, separating the information into different physical machines serves as a security measure, However, in another embodiment, where the information is consolidated in one database, the system maintenance is made easier.

The amount of information about participants varies across embodiments in accordance with who places orders for meals. The ordering process is discussed later. However, if a student places an order, more detailed student information may be desirable, including but not limited to, security credentials for login. If a school official places orders for a participating school district, the student information retained can be limited to data coordinating a student with an order, i.e., the number of students for a which a given item is ordered.

Figure 2:
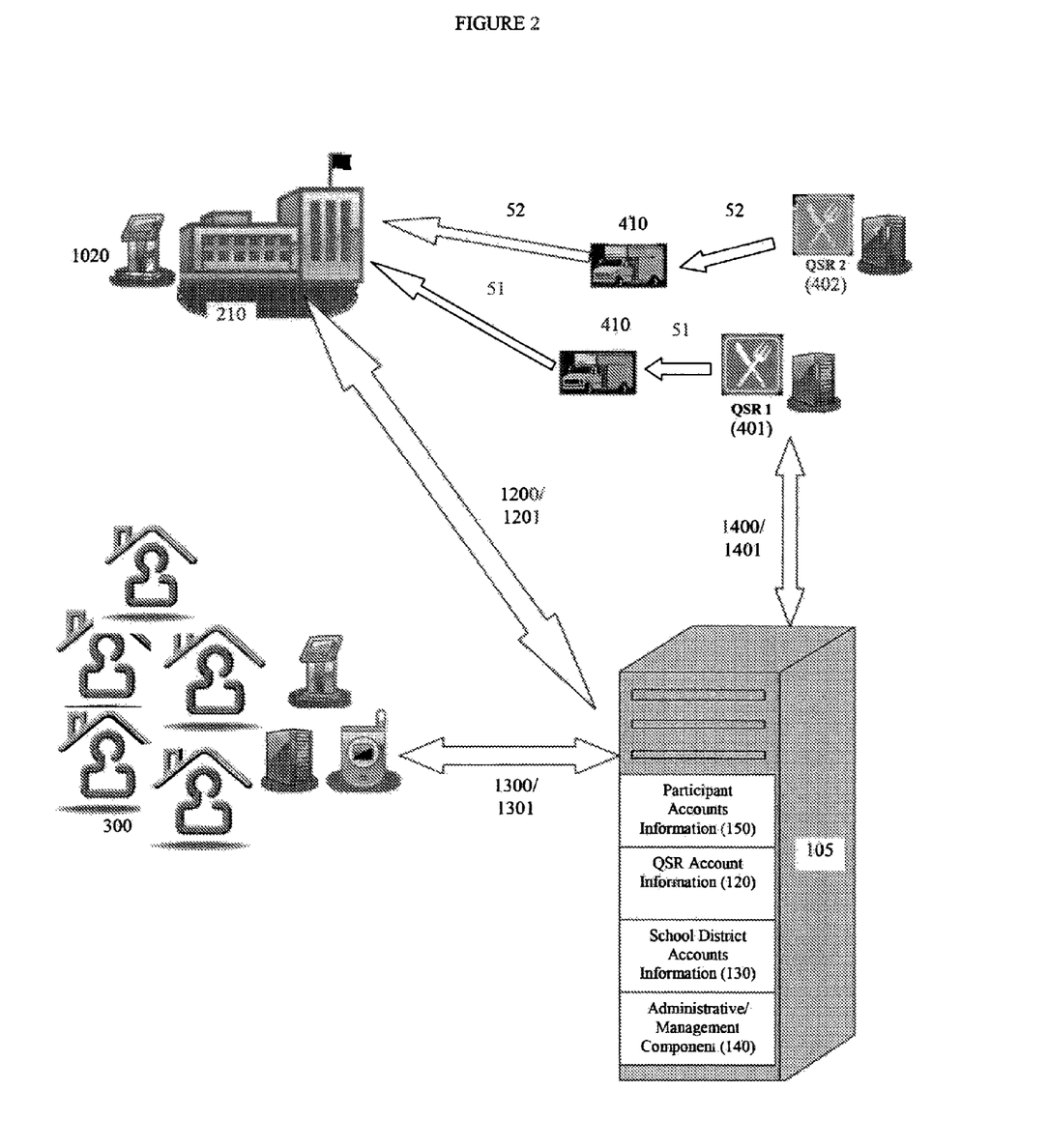
FIG. 2 is a diagram of one embodiment of the Nutrition Service Organization, showing physical components of the system in accordance with one aspect of the present invention.

FIG. 2 is a diagram of one embodiment of the Nutrition Service Organization 100, showing physical components of the method, computer program product, and system. By way of example only, for each school day, Nutrition Service System 110 designates two competing QSR Suppliers 401 and 402 to provide at least one Qualified Menu Items 50a for lunch and at least one Qualified Menu Items 50b for breakfast to Educational Institution 210. No later than the day before delivery, System 110 transmits information to QSR Supplier 401 regarding the total order 51 of Qualified Menu Items via communication 1401. System 110 also transmits information to QSR Supplier 402 regarding order 52 via communication 1401. Designated QSR Suppliers 401/402 are then responsible for receiving, preparing, fulfilling and delivering orders 51 and 52 to the appropriate Educational Institution 210 on each school day. Although not required, in an embodiment QSR Supplier 401/402 deliver orders 51 and 52 with vehicles 410 supplied by Nutrition Service Organization 100 and equipped with appropriate components for the safe delivery of food items.

In accordance with an embodiment of the invention, the QSR Suppliers 400 assigned to each Education Institution 210 are rotated on a daily basis, and the QSR Suppliers 400 are matched with a different, competing QSR Supplier to compete for the Qualified Menu Items 50a/b offered at the Educational Institution 210 to which they are assigned. In an embodiment of the present invention, assignments are initially based on random selection across all available buildings in the district with the rotation schedule providing equal access to each geographically viable QSR Supplier. In further embodiments of the present invention, representatives at buildings in a school district select desired and geographically viable QSR Suppliers.

As a further aspect of this invention, compliance with established guidelines is a benchmark met by participants. In an embodiment of the present invention, participants comply with national food safety programs requirements. For example, the Food and Nutrition Service (FNS) encourages schools to implement food safety standards and best practices on all foods served in the meal programs in order to minimize the risk of food-borne illness among students and the National Sanitation Foundation (NSF) International has developed standards for foodservice equipment to promote sanitation and protect public health. Under the prior art food management models, food safety is often not managed or monitored well.

In the aforementioned embodiment, to achieve compliance with recommended food safety programs, a QSR Supplier is defined for purposes of this invention as a preexisting, established national or regional fast food or fast casual chain restaurant, and the like. Such entities have established purchasing power with food distributors nationwide and are required to comply with food safety laws and regulations governed by the FDA and they already have strict rules, regulations and processes in place to monitor and manage food safety issues. Similarly, a QSR Supplier in accordance with this invention may include any one of the national or regional supermarket chains that prepare and sell "prepared foods".

The QSR industry is intensely competitive. QSRs increasingly compete with one another for customers on the basis of price and product differentiation. In furtherance of the method and system disclosed herein, each QSR Supplier 400 has an incentive to reduce its prices and/or offer better food selections than the other contracting QSR Suppliers 400 with the expectation of higher future demand from Participants 300 in the Nutrition Service Organization 100. By contracting with multiple QSR Suppliers 400 for one market, each QSR will have less market power in the School District 200 and will price more competitively, thus lowering the cost of the Qualified Menu Items 50a/b within the Nutrition Service Organization 100. Furthermore, and as another aspect of this invention, QSRs have established purchasing power with food distribution suppliers on a national level, such that each contracting QSR Supplier 400 will be able to offer Qualified Menu Items 50 at lower costs than an independent caterer or restaurant business. Furthermore, the efficiencies that result when Qualified Menu Items 50 are prepared in a remote location funded by already established day-to-day franchise traffic, and then transported into cafeterias for consumption, will lower food cost to Participants 300 and lower food service expenditures for each School District 200.

As a further aspect of this invention, by enabling and facilitating an increased demand in each School District 200, more QSRs are likely to open up in that community so that School Districts 200 will have even more variety and better options for Qualified Menu Items 50 than those offered by any single catering business or QSR. In turn, each competing QSR Supplier 400 will have more competitors, less market power, and will charge even lower prices for Qualified Menu Items 50.

As described above, in order to contract with the National Service Organization 100, each QSR develops and offers Qualified Menu Items 50 that satisfy FDA nutritional guidelines. In an embodiment, the national and regional QSRs will develop Qualified Menu Items at the corporate level. Corporate QSRs have established, pre-existing test kitchens staffed with nutritionist, chefs, and marketing professionals who can build Qualified Menu Items 50 that meet or exceed the school nutritional standards. In accordance with this invention, each QSR 400 will create healthy food selections with positive food characteristics (e.g., fruit, non-fried vegetable, low-fat or non-fat dairy products, whole-grain foods) that satisfy the NSLP and NSBP.

Food items served to Participants 300 outside of these programs, for example a la carte food items, are not technically required to meet the national nutrition standards set by the NSLP and NSBP. However, in accordance with one aspect of this invention, all food items supplied to Educational Institutions 210 by QSR Suppliers 400 satisfy minimum nutritional requirements set by the Nutrition Service Organization 100. In this way, access to low-fat foods will increase within School District 200, while access to high-fat foods will be restricted.

By creating Qualified Menu Items 50a and 50b as part of the Nutrition Service Organization 100, QSR Suppliers 400 will receive feedback from Participants and their parents regarding Qualified Menu Items 50. Therefore, and as another aspect of the invention, each QSR will receive healthy menu-development opportunities and established test markets that will facilitate and enable them to develop items on their menu that children will want to eat and parents will approve of. Furthermore, by developing Qualified Menu Items 50 that satisfy the NSLP and NSBP, each QSR Supplier 400 will also be more likely to cut down on the fat and calories of their standard franchise menu items.

Under the system of the invention, a minimum number of QSR Suppliers 400 supply a rotating menu to Participants 300 in School District 200. As shown in FIG. 1, for example, under the system of the invention School District 200 has ten Institutions 210 (b) with an average student population ($x_{building}$) of 1000 students and a total student population ($x_{district}$) of 10,000. According to this example, the percentage of students (y) participating in the food service program is 80%, such that the total number of Participants 300 in the school district ($z_{district}$) is 8000. Likewise, the average number of Participants 300 per Institution 210 ($z_{building}$) is 800 students. If the average number of Qualified Menu Items a contracting QSR can supply per meal per day ($i_{avg}$) is approximately 1000 then, in this example, the Nutrition Service Organization 100 requires a minimum ($N_{min}$) of eight contracting QSRs. Therefore, in accordance with the invention, the minimum number of contracting QSRs required can be satisfied by this equation:

$$N_{min} = \frac{y(b \times x_{building})}{i_{avg}}$$

In accordance with the invention, two unaffiliated, competing QSRs within the school district are designated to each Education Institution 210 on each school day in order to provide sufficient variety to Participants 300. Using the above example, each QSR is assigned to two Educational Institutions 210 and will supply an average ($i_{avg}$) of 1000 Qualified Menu Items 50 total for lunch, and possibly breakfast. If a particular QSR cannot supply that many Qualified Menu Items, then it can be designated to only one Education Institution 210 on any particular day.

There is also a maximum number of QSR suppliers 400 that may contract with Nutrition Service Organization 100 in accordance with the invention. For example, if a contracting QSR requires a minimum number of Qualified Menu Items per meal per day ($i_{min}$) of 400 in order to participate in the program, then in this example the maximum number of contracting QSRs ($N_{max}$) in the Nutrition Service Organization 100 is twenty. Therefore, in accordance with the invention, the minimum number of contracting QSRs required can be satisfied by this equation:

$$N_{max} = \frac{y(b \times x_{building})}{i_{min}}$$

Similarly, using this equation one can determine the minimum number of Participants 300 within a particular School District 200 that are required to provide an incentive for a certain number of contracting QSRs (N) to participate in the Nutrition Service Organization 100.

$$N = \frac{y(b \times x_{building})}{i}$$

In each of the above equations, as the participation in the program (y) increases due to increased demand, the number of orders for Qualified Menu Items orders (i) will increase and the number of QSRs that could participate in the program will also increase. This provides an incentive for QSRs to create and develop healthy, low-cost Qualified Menu Items 50 that will be popular with students and will increase the number of Participants 300.

The amount on meals that an individual QSR can supply in a given day is limited by its size and by the time it can devote to preparing these meals. In an aspect of this method, utilizing food delivery vans, a QSR delivers 400-450 meals each day. As the number of participants increases, the number of QSR Suppliers increases to accommodate the population.

Referring to FIG. 1, individual Participants 300 registered with the Nutrition Service Organization 100 are provided with a rotating menu of food items that meet the pre-defined guidelines, which in an embodiment of the present invention, are embodied as business rules in the program code executed by a processor.

In an embodiment of this invention, each QSR Supplier 400 develops at least two Qualified Menu Items 50a for lunch and at least two Items 50b for breakfast. System 100 then designates each QSR to supply at least one of its at least two Qualified Menu Items 50 to a different Educational Institution 210 on a rotating basis. As more than one QSR Supplier 400 may be assigned to a given Education Institution 210, a QSR Supplier 400 will complete with a different QSR Supplier on each day of the rotation.

A QSR Supplier is assigned to a given Educational Institution 210 based on pre-defined factors, including but not limited to, the meals meet the pre-defined nutritional guidelines, the QSR Supplier is geographically favorable, and/or the QSR Supplier can make a number of meals that will satisfy a prospective order, based on the number of student participants in the school district or school to which this QSR Supplier is being assigned.

In the aforementioned embodiment, for example, if ten QSR Suppliers (401-410) contract with said Nutrition Service Organization 100 and each QSR Supplier develops two Qualified Menu Items 50a for lunch and two Qualified Menu Items 50b for breakfast, the total menu offering consists of twenty Qualified Menu Items 50a for lunch and twenty Qualified Menu Items 50b for breakfast. These items will be offered throughout the district on a rotating basis.

In an embodiment of the present inventions, the pattern of the rotation is based upon the number of participants within a given district as well as the physical number of buildings in the district to which a delivery is made. For example, if there are ten buildings in a given district, district there will be about 20 QSRs, if the buildings have a national average student population). QSR 1 and QSR 2 serve building one on Monday and building two on Tuesday. After the Tenth School day QSR 1 and QSR 3 serve building one on day twelve QSR 1 and QSR 3 serve building 2 and so on and so forth.

As participation in the program increase, more QSR Suppliers 400 will contract with the Nutrition Service Organization 100. As the number of contracting QSRs increase, the variety and quality of the Qualified Menu Items 50 will necessarily increase. In turn, the participation in the program will increase. In accordance with this invention, the variety of healthy, low-cost food offerings for school children will increase as compared to previously-known publicly and privately managed food service, including those that are catering based. In contrast to food service programs that currently exist, school children will have more than one healthy entree option and more than one variety of juice to choose from for lunch. The present invention will liberalize healthy menu choices for children by providing greater lunch and breakfast entrée options.

Figure 3:
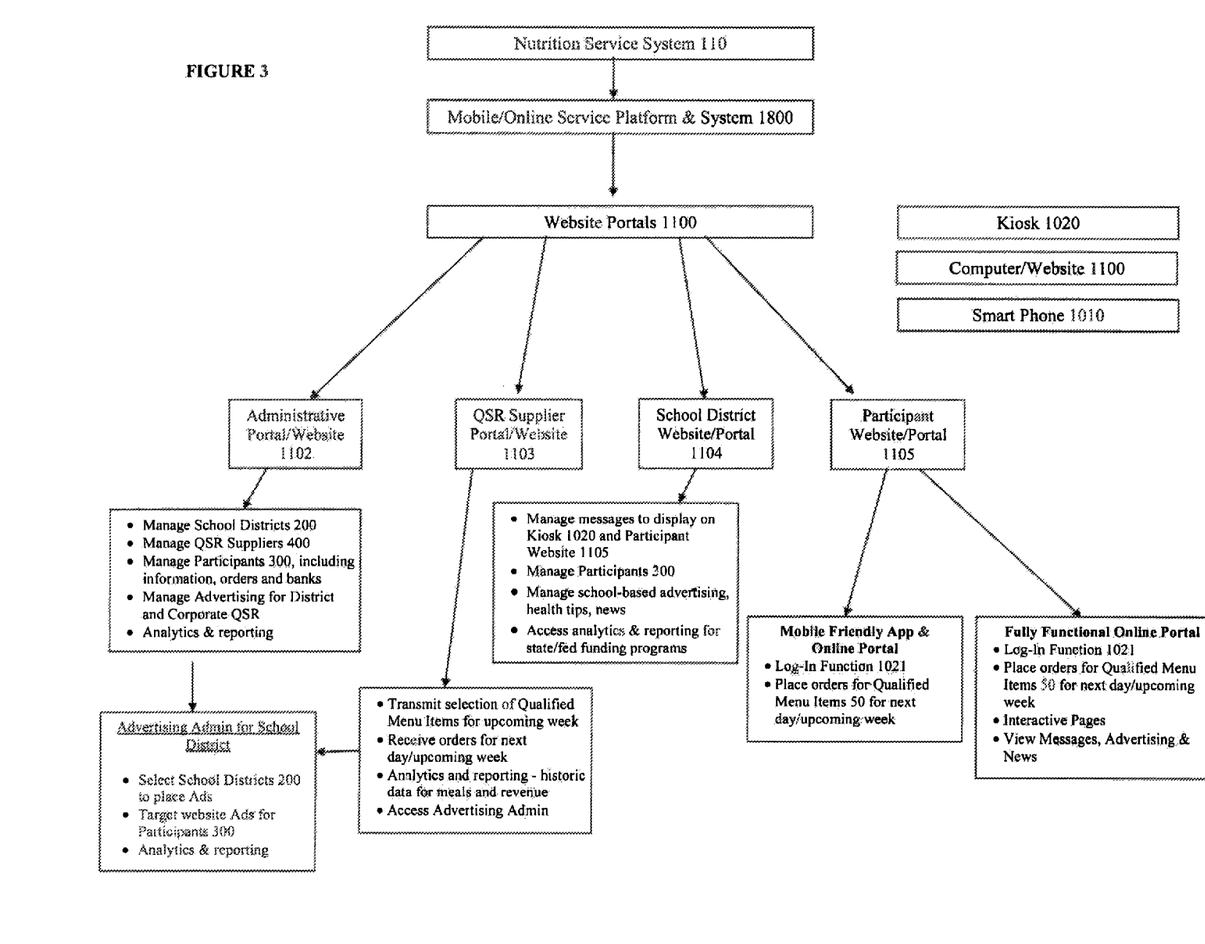
FIG. 3 is a flowchart of one embodiment of the Nutrition Service System in accordance with an aspect of the present invention

FIG. 3 is a flowchart of one embodiment of the Nutrition Service System in accordance with an aspect of the present invention. As shown in FIGS. 1 and 3, mobile and online service platform and system 1800 is a preferred device for offering the method of the invention. Using the appropriate protocols and formats for online and mobile systems (HTML, XML, Java, and so on), communications can be established between Participant 300, School District 200, QSR Supplier 400 and Nutrition Service System 110. In addition to mobile/online platform 1800, System 110 comprises Nutrition Service Software 106 and Database 105, and other related components such as application code, web portals and related hardware. By way of example, Nutrition Service System 110 is preferably embodied in a computer server managed by the administrative component of the Nutrition Service Organization 100. Provided that remote access via a secure communication channel is available, the administrator can be located in a place that is geographically distant from the school districts.

In the preferred embodiment shown in FIG. 2, Nutrition Service System 110 selects and displays available Qualified Menu Items 50 in advance to individual Participants 300 from the Database 105 using the Nutrition Service Software 106 via communication 1300. Nutrition Service Software 106 is provided to capture all Food Item Transactions 1301 for Qualified Menu Items 50 from each participating School District 200, to distribute orders for Qualified Menu Items 50 to each participating QSR Supplier 400. Nutrition Service Software 106 also notifies and sends a report to Education Institution 210 with information regarding which Participants 300 have not placed orders for Qualified Menu Items 50 for the following day.

Referring to FIGS. 1-3, Nutrition Service System 110 is linked to an electronic point of sale, computer or other device 310, including but not limited to a website 1100, kiosk 1020, smartphone 1010, or other mobile electronic device. In accordance with other embodiments of the invention, a call center system may be used or the like, a mobile/text message based system may be used, or a non-electronic embodiment may be used as well.

During Food Item Transaction 1301, individual participants place an order for a Qualified Menu Items 50 from an electronic point of sale device or system 310. Food Item Transaction 1301 can occur as far in advance as one week prior to delivery and no later than midnight the day before delivery. Food Item Transactions 1301 are received by System 100, communicated to the appropriate QSR Supplier 400 via communication 1401, and then fulfilled and delivered directly to Participants 300 by QSR Supplier 400.

In an embodiment of the present invention, participating QSRs for a given district are contracted at the beginning of an academic year. At this time, the system has evaluated and approved a menu offering in accordance with the established guidelines. This approved menu item will be offered for the entirety of the academic year by this QSR. This QSR is assigned to a school district on a given day together with other QSRs. The QSRs receive orders on the assigned day, some less some more depending on how popular each QSR's meal offering is with the students and depending on which meal offerings are from others QSRs that are assigned the same day. Because QSRs are rotated, a given QSR's meal will not complete in the same district against a different QSR's meal every time the first QSR is assigned to this district.

In a given embodiment, each Educational Institution 210 within School Districts 200 has an onsite, on-line Kiosk 1020 integrated and connected to the other components of the Nutrition Service System 110, including but not limited to the Nutrition Service Database 105, Software 106, Web Portals 1100 and Server 1900. Kiosk 1020 is provided by Nutrition Service Organization 100, at no cost to the School Districts 200 or Participants 300. In practice, Kiosk 1020 can be used by Participants 300 via a Log-In Function 1021. Log-In Function 1021 will vary according to the manner in which Nutrition Service System 110 is integrated with School District Website 205. Once logged in, Participants 300 can place orders for Qualified Menu Items 50a/b up to one week in advance, with orders mandatorily placed by midnight for the following day. Likewise, orders for Qualified Menu Items 50 can be switched or deleted by Participants 300 up until midnight of the preceding day.

So that a participating QSR has sufficient time to make any preparations necessary to fill orders, menus can be posted a given amount of time in advance, including but not limited to a day in advance, or for a week a before the week commences, Utilizing a computing device, such as smartphone, computer, mobile computer, and/or designated computer or kiosk, a participant in the program may view the menu. In a given embodiment, because each QSR has set approved meal offerings for an entire school year, the menu may list only the QSR assignment each day. When a QSR has only one approved meal offering, when that QSR is assigned for a given day, the meal offering from that QSR on that day will be the approved meal. For example, if Subway is the QSR and the approved offering is a 6" turkey with lettuce tomato, apples slices, and milk, if they are supplying on a given day, that will be the meal offered each time all year.

As one further aspect of the invention, Kiosk 1020 will provide advertising means for each QSR Supplier at the corporate level. These advertising means include, but are not limited to, full display screen advertisements 2000 when Kiosk 1020 is inactive and permanent display advertisements on both sides of Kiosk 1020. Kiosk 1020 will also allow Education Institution 210 to communicate with Participants 300 via communications 220 which may presumably take the form of news, individual messages to Participants 300, daily events or the like.

In the embodiment shown in FIG. 3, Nutrition Service Database 105 contains information regarding Qualified Menu Items 50 available from each of multiple unaffiliated restaurants, including but not limited to their nutritional information. Pricing information for each Qualified Menu Items 50 will also be stored. Nutrition Service Database 105 also has four different types of accounts and website portals: 1) Participant Accounts 150; 2) School District Accounts 130; 3) QSR Accounts 120; and 4) Management/Administration Account 140. Referring to FIGS. 2 and 3, the above accounts may be preferably embodied as websites or other online portals. In accordance with the invention, System 110 may additionally include a Payment Module 610 designed to allow for direct payment 600 to each QSR Supplier 400 from Participant Bank 310 for each Food Item Transaction 1301.

Database 105 will have one at least Participant account 150 for each Participant 300. Participant account 150 is an account area that has individual student accounts therein, each account having various functions, modules and stored data associated with that student. Such information could include IDs, passwords, Student Bank Account information and other financial information (such as amounts owed or paid), menu options selected by date, personal information, and so on.

Database 105 will also have one account 130 for each School District 200. School district account 130 will have information regarding individual Participants 300, grouped together by Educational Institution 210. These accounts will store, manage and monitor such information for the benefit of School District 200, all of which can be accessed by School District 200 via communication portal 1200 and/or transmitted via communication 1201. For example, in one embodiment of the invention School District 200 is provided information via communication 1201 so that it can notify participants when they need to place a Food Item Transaction 1301 for the following day.

Referring to FIG. 3, in an embodiment School Districts 200 access the Nutrition Service System 110 via the website portal 1104. School Districts 200 can utilize this portal to receive a list of Participants 300 and their order to facilitate distribution of food items. Furthermore, all state and federal funding for free and reduced programs under the NSLP and NSBP are managed by School District 200. School District 200 can also use website portal 1104 to transmit information via communication 1200 regarding delivery times for lunch and breakfast, requirements for new students to be added to the system, and other details the Nutrition Service System 100 may require.

With the method disclosed herein, School Districts 200 do not need to perform any of the standard publicly-managed food service tasks, such as food preparation, billing or menu creation. Rather, individual Participant 300 deals directly with the Nutrition Service System 110 regarding the selection of Qualified Menu Items 50, orders, and payment.

In practice, Participants 300 or a representative will log onto the Nutrition Service System 110 on a regular (e.g., monthly, daily) basis using their individual Participant Accounts 150 and will access the daily, monthly, or preferably weekly menu of Qualified Menu Items 50. Thus, depending upon security configuration, a student, a parent, and/or an administrator may place an order for a Participant 300 Participants 300 then selects menu options for the month, the week or the next day, whichever is applicable, according to the configuration of the embodiment. Participant 300 can order one Qualified Menu Item 50 from one QSR Supplier 400 and a second Qualified Menu Item 50 item from a second QSR for the same meal. Therefore, multiple combinations are available for both lunch and breakfast in accordance with this invention. After ordering, payment 600 is submitted directly to QSR Suppliers 400 from Student Bank 310 via the Nutrition Service System 110 using payment module 610. Neither the School District 200 nor the Participants 300 need to handle money.

As discussed above, Nutrition Service System 110 communicates directly with Participants 300 via website, email, mobile device or other available communication portal, on a daily basis if necessary. For example, if Participant A has not selected a Qualified Menu Items 50a or 50b for Tuesday of Week 1, then Nutrition Service System 110 will contact Participant A on Monday of Week 1 via mobile device 1010, website 1100, or other available communication portal such as text messaging or email, and thereby prompt Participant A to place an order for lunch and/or breakfast for the following day. In one embodiment, Nutrition Service System 110 will provide at least two Qualified Menu Items 50 from two QSR Suppliers 400 to Participant A, so that Participant A has an option of four Qualified Menu Items 50a for lunch and four Qualified Menu Items 50b for breakfast. Participant A will be able to place an order via device 310.

Database 105 will store data related to at least one account 120 for each QSR 400. Referring to FIG. 3, each contracting QSR Supplier 400 accesses the Nutrition Service System 110 via the its website portal 1103 to receive orders via communication 1401 for Qualified Menu Items 50 for each school day. Information regarding Qualified Menu Items can also be transmitted to System 110 via communication 1400.

Each QSR Supplier 400 is responsible for delivering Qualified Menu Items to each Educational Institution 210 for distribution to Participants 300 on each school day. In an embodiment of the invention, and as shown in FIG. 2, each QSR Supplier 400 is given a vehicle 410 from Nutrition Service Organization 100 for said delivery services. The provision of catering vehicles 410 to contracting QSRs for delivery of orders, such as orders 51 and 52, sets the present invention even further apart from known food service methods and systems. In a most preferred embodiment, vehicles 410 are equipped with the appropriate food safety components, such as rolling carts with trays, and heating and cooling mechanisms. Using vehicles 410, each QSR is responsible for delivering the Qualified Menu Items 50 that correspond to the Food Item Transactions 1301 from Participants 300 and for staffing the appropriate staff to distribute said orders to the appropriate students.

By using the system of the invention, the addition of the one or more contracting QSRs to the nutritional service program can be done quite easily. Furthermore, the School Districts 200 and Educational Institutions 210 do not have to deal directly with contracting caterers or outside management services.

Table 1 shown herein provides other example Qualified Menu Items 50 that would necessarily satisfy the NSLP and NSBP dietary requirements.

TABLE 1

Sample Menu Items

| QSR | | Sides/Drink |
|---|---|---|
| | Lunch Entrees | |
| Chipotle | Tacos | side of rice and beans |
| | Small quesadillas | chips |
| Subway | Turkey, ham, roast beef, or veggie mini-sandwich (without cheese), | Apple slices Milk or juice |
| Jason's Deli | Organic peanut butter and jelly sandwich, Turkey and cheese sandwich on wheat bread or organic wheat wrap, Nitrite-free ham and cheese sandwich | Salad organic apples, organic carrots, fresh fruit or chips, and a drink of organic white or chocolate milk, organic apple juice, or a fountain drink |
| Garbanzo Mediterranean Grill | Grilled cheese pita Peanut butter and jelly pita Chicken or steak rice bowl Half pita stuffed with falafel, chicken or steak, Falafel with marinated chicken or steak | Seasoned rice, Apple slices Chips |
| | Breakfast Entrees | |
| Burger King | Breakfast muffin sandwich | Apple Fries Milk or juice |

A broad range of reporting options, news options and other ancillary functions may also be supported by the invention. As a further aspect of this invention, the Nutrition Service provides each QSR Supplier 400 with options for marketing, test markets and advertising. Children wield enormous purchasing power both directly and indirectly and are not only a current market, but also a future market to QSRs. Therefore, brand power, exposure and marketing to children is essential to the industry. In accordance with this method and system, a number of different advertising means are provided.

Figure 4:
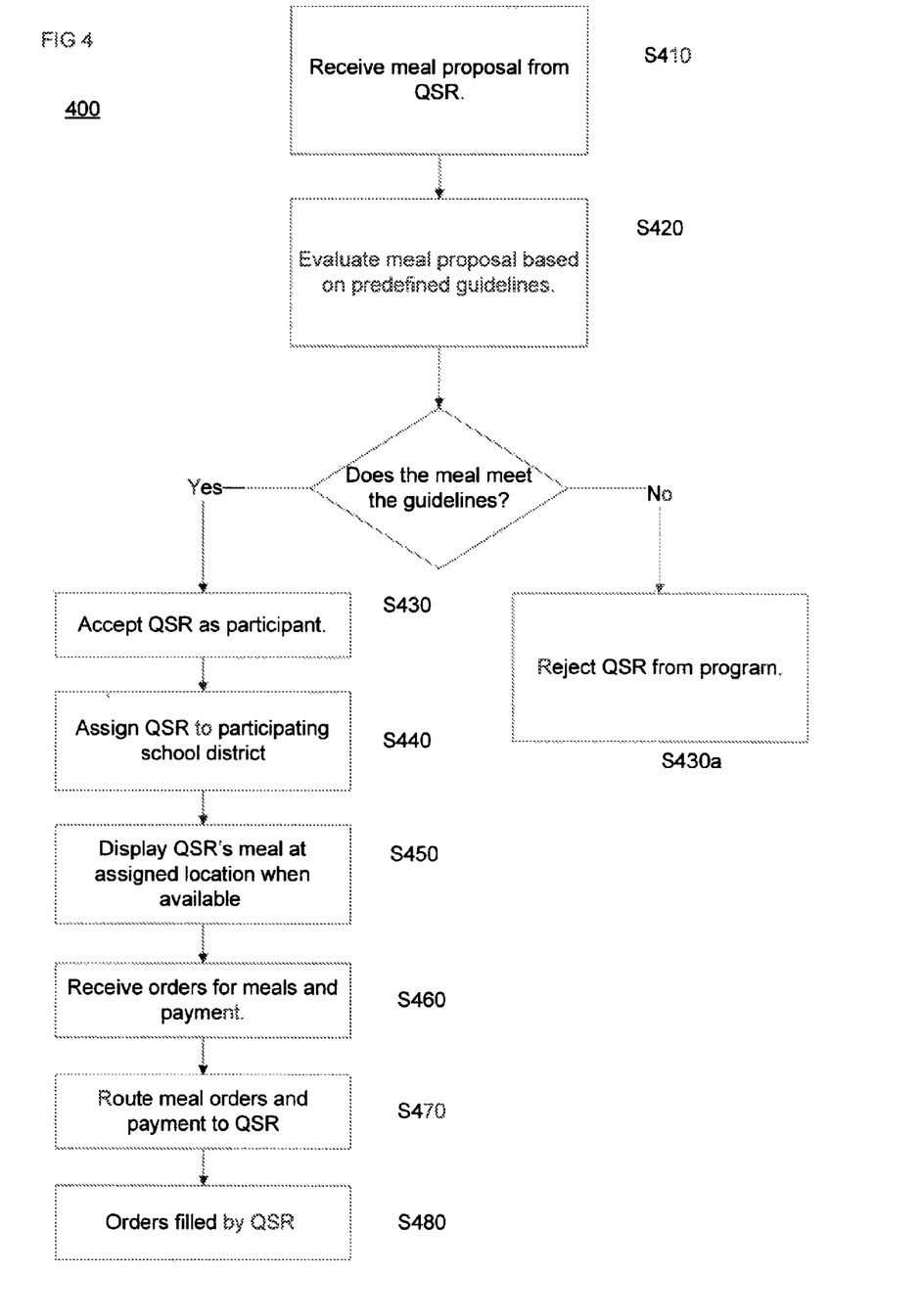
FIG. 4 is a workflow incorporating one or more aspects of the present invention.

FIG. 4 is a simplified workflow 400 is an embodiment of the technique disclosed. First, the system receives a meal proposal from a QSR (S410). The proposal includes the meal and the number of meals that the QSR can supply at a given meal time. The system evaluates the meal submission based pre-defined guidelines within the system (S420). If the meal meets the guidelines, the QSR is accepted (S430). If the meal does not meet the guidelines, the QSR is rejected (S430a). The QSR can continue to enter new meal proposals until one is accepted (S430). The pre-defined guidelines may comprise, for example, USDA health guidelines.

Based on criteria including but not limited to the geographic location of the QSR and the number of meals available, the QSR is assigned to a school district (S440). The meal is then displayed to participants via a user interface in advance of the meal (S450). The meal may be available to different locations within the school district on a rotating schedule. Based upon the displayed menu, orders are received for the meal (S460). The orders include payment, which is processed and sent electronically to the QSR. Orders are routed to the QSR (S470), who upon receipt of the orders, the QSR prepares and delivers the meals ordered (S480). In another embodiment of the present technique, the delivery is outsourced so the QSR is only responsible for preparing the promised meals.

The QSR can receive the entered orders for its offered meals by logging onto the system. The QSR may also receive notifications, such as emails, and/or a consolidated email covering the number of orders during a given menu period.

Figure 5:
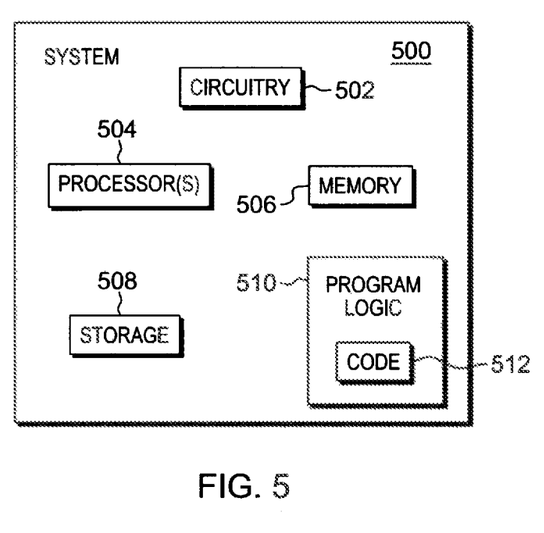
FIG. 5 depicts one embodiment of a single processor computing environment to incorporate and use one or more aspects of the present invention.

FIG. 5 illustrates a block diagram of a resource 500 in computer system 110 and/or server 120, which is part of the technical architecture of certain embodiments of the technique. Computers resources within the discussed embodiment include, but are not limited to Database 105. The resource 500 may include a circuitry 502 that may in certain embodiments include a microprocessor 504. The computer system 500 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

Figure 6:
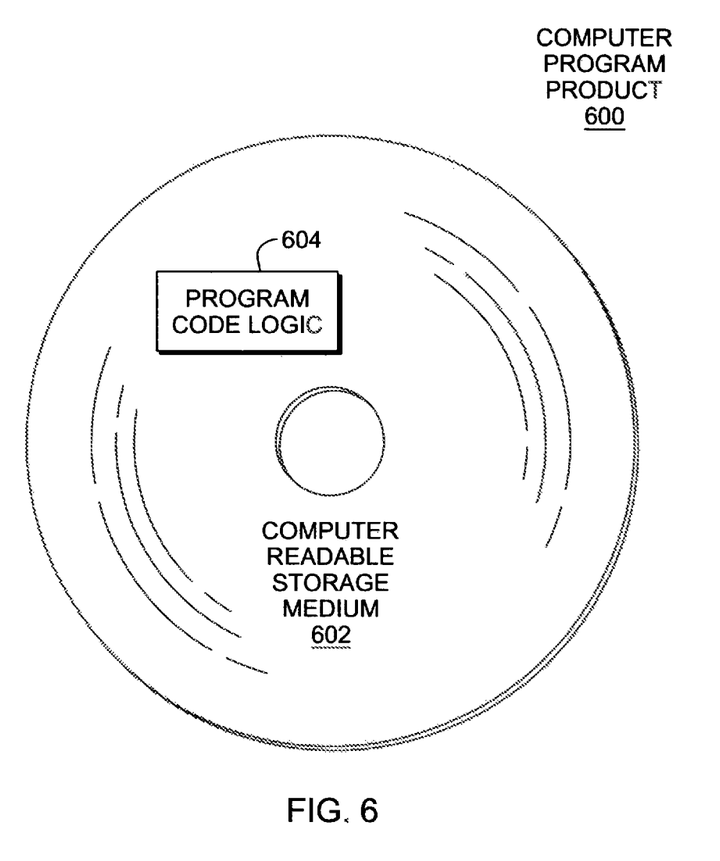
FIG. 6 depicts one embodiment of a computer program product incorporating one or more aspects of the present invention.

Using the processing resources of a resource 500 to execute software, computer-readable code or instructions, does not limit where this code is can be stored. Referring to FIG. 6, in one example, a computer program product 600 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/ or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for providing meals to consumers in a school district, the method comprising:
   obtaining, by a processor, a submission from a first food service supplier wherein the submission comprises a first meal offering;
   responsive to obtaining the first meal offering, automatically determining whether the first meal offering complies with predefined guidelines executed by the processor;
   obtaining, by a processor, a submission from a second food service supplier wherein the submission comprises a second meal offering;
   responsive to obtaining the second meal offering, automatically determining whether the second meal offering complies with the predefined guidelines executed by the processor;
   responsive to determining that the first meal offering and the second meal offering meet the predefined guidelines executed by the processor, automatically assigning the first meal offering and the second meal offering to a first population for a first predefined period of time, wherein the first meal offering and the second meal offering are available to the first population during the first predefined period of time;
   displaying the first meal offering and the second meal offering on a client, for selection by a user in the first population during the first predefined period of time, wherein the user can select either the first meal offering or the second meal offering during the first predefined period of time; and
   obtaining, via user input, an order for one of the first meal offering or the second meal offering.

2. The method of claim 1, wherein the predefined guidelines comprise nutritional guidelines for the National School Lunch Program and School Breakfast Program.

3. The method of claim 1, further comprising:
   obtaining payment information with the order;
   processing the payment information to authorize an electronic payment; and
   transmitting the electronic payment to the first service provider.

4. The method of claim 1, wherein the automatically assigning comprises evaluating whether the first food service supplier and the second food service supplier are geographically accessible to the first population.

5. The method of claim 4, further comprising:
   assigning the first meal item to a scheduled interval during the during the first predefined period of time so the first meal item is displayed to the user in the first population during the scheduled interval.

6. The method of claim 4, wherein the first population is a school district.

7. The method of claim 1, wherein the predefined guidelines comprise a requirement that the first meal offering provide at least 33.3% of the U.S. Recommended Dietary Allowance for protein, calories, calcium, iron and vitamins A and C, and less than 30% of calories come from fat and less than 10% from saturated fat.

8. The method of claim 1, wherein the first meal offering is one of: a breakfast offering, a lunch offering.

9. The method of claim 1, further comprising:
   upon expiration of the predefined first period of time, automatically assigning the first meal offering to a second population for a second predefined period of time and automatically assigning the second meal offering to a third population for the second predefined period of time, wherein the first meal offering is available for selection by a user in the second population during the second predefined period of time and the second meal offering is available for selection by a user in the third population during the second predefined period of time.

10. A computer system for providing meals to consumers in a school district, the computer system comprising:
    a memory; and
    a processor in communication with the memory, wherein the computer system is configured to perform a method comprising:
      obtaining, by a processor, a submission from a first food service supplier wherein the submission comprises a first meal offering;
      responsive to obtaining the first meal offering, automatically determining whether the first meal offering complies with predefined guidelines executed by the processor;
      obtaining, by a processor, a submission from a second food service supplier wherein the submission comprises a second meal offering;
      responsive to obtaining the second meal offering, automatically determining whether the second meal offering complies with the predefined guidelines executed by the processor;
      responsive to determining that the first meal offering and the second meal offering meet the predefined guidelines executed by the processor, automatically assigning the first meal offering and the second meal offering to a first population for a first predefined period of time, wherein the first meal offering and the second meal offering are available to the first population during the first predefined period of time;
      displaying the first meal offering and the second meal offering on a client, for selection by a user in the first population during the first predefined period of time, wherein the user can select either the first meal offering or the second meal offering during the first predefined period of time; and
      obtaining, via user input, an order for one of the first meal offering or the second meal offering.

11. The computer system of claim 10, the method further comprising:
    obtaining payment information with the order;
    processing the payment information to authorize an electronic payment; and transmitting the electronic payment to the first service provider.

12. The computer system of claim 10, wherein the automatically assigning comprises evaluating whether the first food service supplier and the second food service supplier are geographically accessible to the first population.

13. The computer system of claim 12, the method further comprising:
assigning the first meal item to a scheduled interval during the during the first predefined period of time so the first meal item is displayed to the user in the first population during the scheduled interval.

14. The computer system of claim 10, the method further comprising:
upon expiration of the predefined first period of time, automatically assigning the first meal offering to a second population for a second predefined period of time and automatically assigning the second meal offering to a third population for the second predefined period of time, wherein the first meal offering is available for selection by a user in the second population during the second predefined period of time and the second meal offering is available for selection by a user in the third population during the second predefined period of time.

15. A computer program product for providing meals to consumers in a school district, the computer program product comprising:
a computer readable storage medium having computer readable program code embodied therewith, the computer readable program code comprising:
computer readable program code configured to obtain a submission from a first food service supplier wherein the submission comprises a first meal offering;
responsive to obtaining the first meal offering, computer readable program code configured to automatically determine whether the first meal offering complies with predefined guidelines executed by the processor;
computer readable program code configured to obtain a submission from a second food service supplier wherein the submission comprises a second meal offering;
responsive to obtaining the second meal offering, computer readable program code configured to automatically determine whether the second meal offering complies with the predefined guidelines executed by the processor;
responsive to determining that the first meal offering and the second meal offering meet the predefined guidelines executed by the processor, computer readable program code configured to automatically assign the first meal offering and the second meal offering to a first population for a first predefined period of time, wherein the first meal offering and the second meal offering are available to the first population during the first predefined period of time;
computer readable program code configured to display the first meal offering and the second meal offering on a client, for selection by a user in the first population during the first predefined period of time, wherein the user can select either the first meal offering or the second meal offering during the first predefined period of time; and
computer readable program code configured to obtain, via user input, an order for one of the first meal offering or the second meal offering.

16. The computer program product of claim 15, further comprising:
computer readable program code configured to obtain payment information with the order;
computer readable program code configured to process the payment information to authorize an electronic payment; and
computer readable program code configured to transmit the electronic payment to the first service provider.

17. The computer program product of claim 15, wherein the computer readable program code configured to automatically assign comprises computer readable program code configured evaluate whether the first food service supplier is geographically accessible to the first population.

18. The computer program product of claim 17, further comprising:
computer readable program code configured to assign the first meal item to a scheduled interval during the during the first predefined period of time so the first meal item is displayed to the user in the first population during the scheduled interval.

19. The computer program product of claim 15, wherein the predefined guidelines comprise nutritional guidelines for the National School Lunch Program and School Breakfast Program.

20. The computer program product of claim 15, further comprising:
upon expiration of the first predefined period of time, computer readable program code configured to automatically assign the first meal offering to a second population for a second predefined period of time and to automatically assign the second meal offering to a third population for the second predefined period of time wherein the first meal offering is available for selection by a user in the second population during the second predefined period of time and the second meal offering is available for selection by a user in the third population during the second predefined period of time.

* * * * *

UNITED STATES PATENT AND TRADEMARK OFFICE
CERTIFICATE OF CORRECTION

PATENT NO.         : 8,690,577 B2                                            Page 1 of 1
APPLICATION NO.    : 13/527919
DATED              : April 8, 2014
INVENTOR(S)        : Cahoon et al.

It is certified that error appears in the above-identified patent and that said Letters Patent is hereby corrected as shown below:

In the Claims

Column 20, Lines 2 & 3: Claim 5, Delete "during the during the" and replace with -- during the --

Column 21, Lines 9 & 10: Claim 13, Delete "during the during the" and replace with -- during the --

Column 22, Lines 31 & 32: Claim 18, Delete "during the during the" and replace with -- during the --

Signed and Sealed this
First Day of July, 2014

Michelle K. Lee
*Deputy Director of the United States Patent and Trademark Office*